United States Patent
Hahn et al.

(10) Patent No.: US 12,019,917 B2
(45) Date of Patent: Jun. 25, 2024

(54) PEER RAID CONTROL AMONG PEER DATA STORAGE DEVICES

(71) Applicant: Western Digital Technologies, Inc., San Jose, CA (US)

(72) Inventors: Judah Gamliel Hahn, Ofra (IL); Ramanathan Muthiah, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/849,957

(22) Filed: Jun. 27, 2022

(65) Prior Publication Data

US 2023/0418518 A1    Dec. 28, 2023

(51) Int. Cl.
*G06F 3/06* (2006.01)

(52) U.S. Cl.
CPC .......... *G06F 3/0659* (2013.01); *G06F 3/0607* (2013.01); *G06F 3/064* (2013.01); *G06F 3/0689* (2013.01)

(58) Field of Classification Search
None
See application file for complete search history.

(56) References Cited

U.S. PATENT DOCUMENTS

| | | |
|---|---|---|
| 10,097,636 B1 | 10/2018 | Maroney |
| 10,409,511 B1 | 9/2019 | Subbarao et al. |
| 10,592,144 B2 | 3/2020 | Roberts et al. |
| 10,725,941 B2 | 7/2020 | Subbarao et al. |
| 10,901,848 B2 | 1/2021 | Roberts |
| 11,182,258 B2 | 11/2021 | Knestele et al. |
| 11,281,601 B2 | 3/2022 | Subbarao et al. |
| 2002/0075885 A1* | 6/2002 | Vanderzee ............... G06F 13/42 370/451 |
| 2013/0159622 A1 | 6/2013 | Cohen |
| 2019/0384506 A1 | 12/2019 | Shivanand et al. |
| 2020/0042390 A1* | 2/2020 | Roberts ............... G06F 11/1092 |
| 2020/0218617 A1 | 7/2020 | Knestele et al. |
| 2021/0311639 A1 | 10/2021 | Kotzur et al. |

* cited by examiner

*Primary Examiner* — Michael Alsip
(74) *Attorney, Agent, or Firm* — Patent Law Works LLP

(57) ABSTRACT

Example storage systems, data storage devices, and methods provide redundant array of independent disk (RAID) control among peer storage devices. A master storage device among peer storage devices receives host commands and determines, based on a peer RAID configuration, data blocks for redundantly storing the host data unit among the peer storage devices. The master storage device allocates the data blocks among the peer storage devices and sends them to the peer storage devices using a peer communication channel.

20 Claims, 7 Drawing Sheets

PEER RAID CONTROL AMONG PEER DATA STORAGE DEVICES

TECHNICAL FIELD

The present disclosure generally relates to data storage systems, and in a more particular example, to data storage systems including data storage devices capable of peer-to-peer communication for redundant array of independent disk (RAID) control.

BACKGROUND

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives (SSDs), hard disk drives (HDDs), tape drives, hybrid drives, etc.).

RAID controllers may be configured to receive host storage commands, aggregate host data into RAID stripes, calculate parity (depending on RAID level), and send resulting RAID data blocks to the storage devices in the array. They may represent additional hardware, overhead, and complexity between the host system and the array of storage devices.

Therefore, there still exists a need for a storage system that enables a group of data storage devices, such as SSDs, to manage RAID configuration and control without using host or intermediate resources other than a peer-to-peer communication channel.

SUMMARY

Various aspects for peer RAID control among peer storage devices, particularly, RAID control using a peer data storage device as the master RAID controller are described.

One general aspect includes a storage device including: a processor; a memory; a non-volatile storage medium; an interface configured to communicate with a plurality of peer storage devices over a peer communication channel; and a peer redundant array of independent disks (RAID) controller, stored in the memory for execution by the processor. The peer RAID controller is configured to: receive a host storage command for a data unit from a host system; determine, based on a peer raid configuration, a plurality of data blocks for redundantly storing the data unit among the plurality of peer storage devices; allocate, based on the peer raid configuration, the plurality of data blocks to target peer storage devices among the plurality of peer storage devices; and send, through the peer communication channel, the plurality of data blocks to the target peer storage devices.

Implementations may include one or more of the following features. The storage device may include a raid mapping table, where the peer RAID controller may be further configured to: determine a peer storage location for each data block of the plurality of data blocks; and store, for each data block of the plurality of data blocks, the peer storage location in the raid mapping table. The peer RAID controller may be further configured to: receive, from the host system, a host read command targeting the data unit; determine, based on the raid mapping table, the peer storage location for each data block of the plurality of data blocks; send, to the target peer storage devices and through the peer communication channel, peer read commands for the plurality of data blocks; aggregate the plurality of data blocks into the data unit; and return, responsive to the host read command, the data unit to the host system. The peer RAID controller may be further configured to: determine a plurality of peer storage commands corresponding to the plurality of data blocks; and send, through the peer communication channel, the plurality of peer storage commands. The storage device may include a remotely addressable memory configured for direct memory access by the host system that may include: at least one host command queue configured to receive the host storage command; and host cache configured to receive the host data unit. Each peer storage device of the plurality of peer storage devices may include a remotely addressable memory configured to include: at least one peer command queue configured to receive peer storage commands from the peer RAID controller; and peer cache configured to receive at least one data block of the plurality of data blocks. The peer RAID controller may be further configured to: move, using direct memory access through the peer communication channel, the plurality of data blocks from the remotely addressable memories of the target peer storage devices to a data unit location in the host cache; and indicate, to the host system, the data unit location for returning the data unit. The peer RAID controller may be further configured to generate at least one parity block based on the data unit; and the plurality of data blocks may include the at least one parity block. The peer RAID controller may be further configured to: determine at least one data block of the plurality of data blocks is unrecoverable from a target peer storage device; recover, from the at least one parity block and a portion of the plurality of data blocks, the at least one data block that is unrecoverable from the target peer storage device; and return the data unit to the host system. The storage device may include master handoff logic, stored in the memory for execution by the processor, configured to: determine a next master storage device from the plurality of peer storage devices; and transfer peer raid controller functions to the next master storage device.

Another general aspect includes a computer-implemented method including: establishing, among a plurality of peer storage devices, a peer communication channel; receiving, by a first peer storage device, a host storage command for a data unit from a host system; determining, by the first peer storage device and based on a peer redundant array of independent disks (RAID) configuration, a plurality of data blocks for redundantly storing the data unit among the plurality of peer storage devices; allocating, by the first peer storage device and based on the peer RAID configuration, the plurality of data blocks to target peer storage devices among the plurality of peer storage devices; and sending, by the first peer storage device and through the peer communication channel, the plurality of data blocks to the target peer storage devices.

Implementations may include one or more of the following features. The computer-implemented method may include: determining a peer storage location for each data block of the plurality of data blocks; and storing, for each data block of the plurality of data blocks, the peer storage location in a RAID mapping table in the first peer storage device. The computer-implemented method may include: receiving, by the first peer storage device and from the host system, a host read command targeting the data unit; determining, by the first peer storage device and based on the raid mapping table, the peer storage location for each data block of the plurality of data blocks; sending, by the first peer storage device and to the target peer storage devices, peer read commands through the peer communication channel for the plurality of data blocks; aggregating, by the first peer storage device, the plurality of data blocks into the data unit; and returning, by the first peer storage device and responsive to the host read command, the data unit to the host system. The computer-implemented method may include: determining, by the first peer storage device, a plurality of peer storage commands corresponding to the plurality of data blocks; and sending, through the peer communication channel, the plurality of peer storage commands. The computer-implemented method may include: receiving, by the first peer storage device, the host storage command in a remotely addressable memory of the first peer storage device configured for direct memory access by the host system; and returning, by the first peer storage device and to the host system, the host data unit from a host cache in the remotely addressable memory. The computer-implemented method may include: sending, by the first peer storage device, peer storage commands corresponding to the plurality of data blocks to peer command queues in remotely addressable memories in the target peer storage devices; and receiving, by the first peer storage device and from the target peer storage devices, the plurality of data blocks from peer cache in the remotely addressable memories in the target peer storage devices. The computer-implemented method may include: moving, using direct memory access through the peer communication channel, the plurality of data blocks from the remotely addressable memories of the target peer storage devices to a data unit location in the host cache of the first peer storage device; and indicating, by the first peer storage device and to the host system, the data unit location for returning the data unit. The computer-implemented method may include: generating, by the first peer storage device, at least one parity block based on the data unit, where the plurality of data blocks includes the at least one parity block; determining, by the first peer storage device, that at least one data block of the plurality of data blocks is unrecoverable from a target peer storage device; recovering, from the at least one parity block and a portion of the plurality of data blocks, the at least one data block that is unrecoverable from the target peer storage device; and returning the data unit to the host system. The computer-implemented method may include: determining a next master storage device from the plurality of peer storage devices; and transferring peer raid controller functions from the first peer storage device to the next master storage device.

Still another general aspect includes a storage system including a plurality of peer storage devices, where a first peer storage device of the plurality of peer storage devices includes: a non-volatile storage medium; means for establishing, among a plurality of peer storage devices, a peer communication channel; means for receiving, by a first peer storage device, a host storage command for a data unit from a host system; means for determining, by the first peer storage device and based on a peer raid configuration, a plurality of data blocks for redundantly storing the data unit among the plurality of peer storage devices; means for allocating, by the first peer storage device and based on the peer raid configuration, the plurality of data blocks to target peer storage devices among the plurality of peer storage devices; and means for sending, by the first peer storage device and through the peer communication channel, the plurality of data blocks to the target peer storage devices.

The various embodiments advantageously apply the teachings of multi-device storage systems and their component data storage devices to improve the functionality of such computer systems. The various embodiments include operations to overcome or at least reduce the issues in the previous storage systems discussed above and, accordingly, are more efficient and scalable than other computer data storage architectures for some applications. That is, the various embodiments disclosed herein include hardware and/or software with functionality to improve the efficiency and scalability of RAID arrays of data storage devices, based on managing RAID control across a plurality of peer storage devices using a data storage device as the master RAID controller. Accordingly, the embodiments disclosed herein provide various improvements to storage systems.

It should be understood that language used in the present disclosure has been principally selected for readability and instructional purposes, and not to limit the scope of the subject matter disclosed herein.

DETAILED DESCRIPTION

Figure 1:
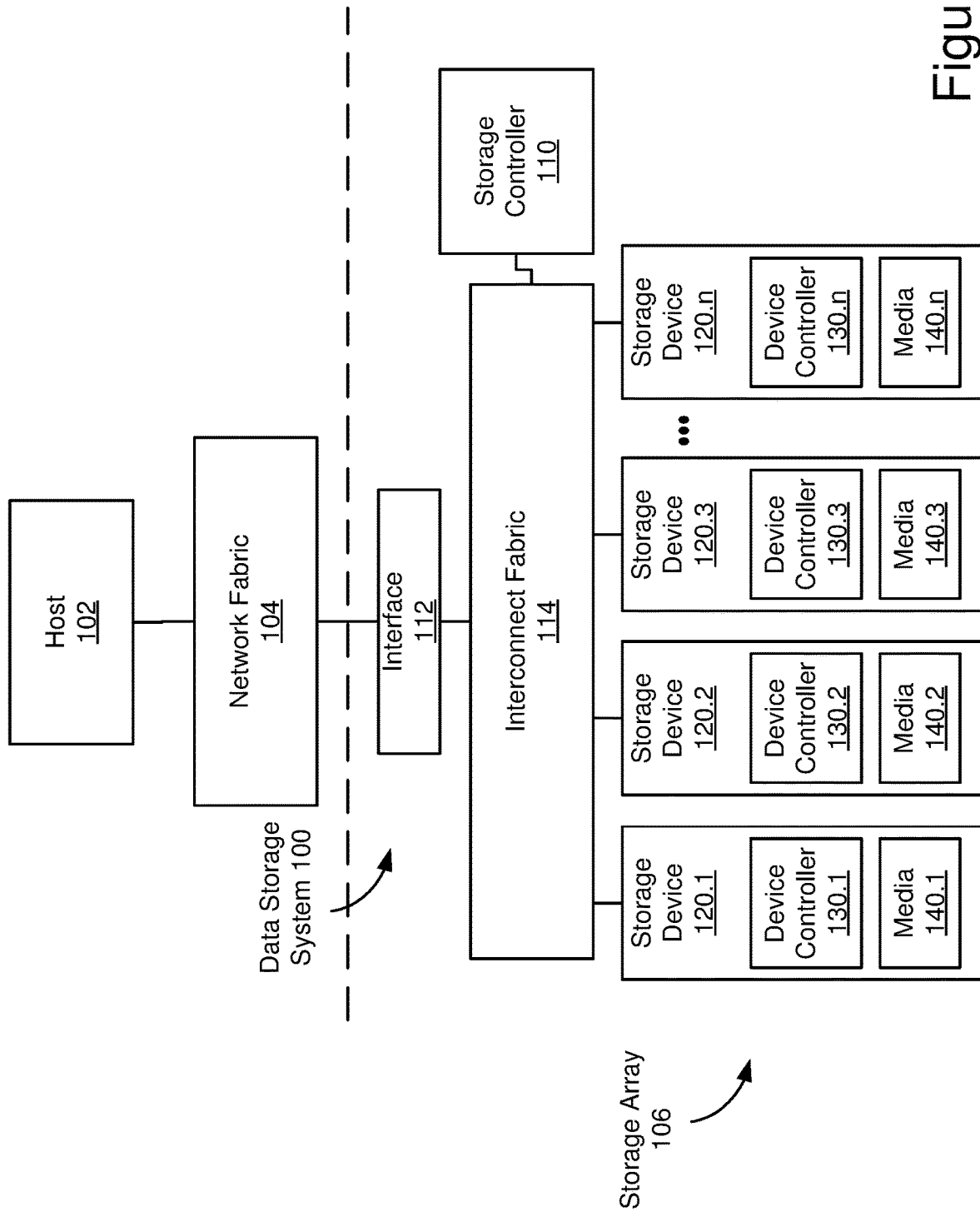
FIG. 1 schematically illustrates an example of a multi-device storage system.

FIG. 1 shows an embodiment of an example data storage system 100 including a peer group of data storage devices 120 coupled with each other for peer-to-peer communication. While some example features are illustrated, various other features have not been illustrated for the sake of brevity and so as not to obscure pertinent aspects of the example embodiments disclosed herein. To that end, as a non-limiting example, data storage system 100 includes a storage array 106 of one or more data storage devices 120 (also sometimes called information storage devices, storage devices, or memory devices) configured for storage of host data in a non-volatile storage medium.

In some embodiments, the data storage devices 120 are, or include, solid-state drives (SSDs). Each data storage device 120.1-120.n may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels).

In some embodiments, a respective data storage device 120 may include a single media device 140 while in other embodiments the respective data storage device 120 includes a plurality of media devices. In some embodiments, media devices include NAND-type flash memory or NOR-type flash memory. In some embodiments, data storage device 120 includes one or more hard disk drives (HDDs), tape drives, or hybrid drives. In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

Storage controller 110 may be coupled to data storage devices 120.1-120.n through interconnect fabric 114. In some embodiments, storage controller 110 may be hosted as a component and/or a subsystem of another component of data storage system 100. For example, in some embodiments, some or all of the functionality of storage controller 110 may be implemented by software executed on one or more compute resources in at least one of data storage devices 120.1-120.n, interconnect fabric 114, or interface 112. Storage controller 110 is sometimes called a controller system, a main controller system, a non-volatile memory express (NVMe) controller, garbage collection (GC) leader, network interface controller, RAID controller, or storage virtualization controller (SVC). In some embodiments, a device controller 130.1 associated with a particular storage device (e.g., 120.1) acts as storage controller 110 for other storage devices (e.g., 120-2, 120-3, and 120.n) in data storage system 100. In some embodiments, storage controller 110, the one or more device controllers 130, and media devices 140 are included in the same physical device (i.e., an integrated device) as components thereof, such as an all-flash array appliance. In some embodiments, storage controller 110 is a component and/or subsystem of host 102.

In some embodiments, host 102 is coupled to data storage system 100 through interface 112 over a network fabric 104. In some embodiments, multiple hosts 102 (only one of which is shown in FIG. 1) are coupled to data storage system 100 through interface 112, which may be a storage network interface or other interface capable of supporting communications with multiple hosts 102. Network fabric 104 may include a wired and/or wireless network (e.g., public and/or private computer networks in any number and/or configuration) which may be coupled in a suitable way for transferring data. For example, network fabric 104 may include any means of a conventional data communication network such as a local area network (LAN), a wide area network (WAN), a telephone network, such as the public switched telephone network (PSTN), an intranet, the internet, or any other suitable communication network or combination of communication networks. In some embodiments, interface 112 includes one or more network and/or peripheral communication bus interfaces for data storage system 100, such as the physical interface for storage controller 110 and/or a shared network or peripheral bus comprising interconnect fabric 114.

Host 102, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 102 is sometimes called a host system, client, or client system. In some embodiments, host 102 is a server system, such as a server system in a data center. In some embodiments, the one or more hosts 102 are one or more host devices distinct from storage controller 110 and distinct from the plurality of storage devices 120; but in some other embodiments, the one or more hosts 102 include one of the storage devices 120 that has been configured to perform data processing operations and to send data storage commands to access data stored in the one or more storage devices 120. In some other embodiments, the one or more hosts 102 are configured to store and access data in the plurality of storage devices 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

The one or more device controllers 130, if included in a respective storage device 120, are coupled with storage controller 110 through interconnect fabric 114. Interconnect fabric 114 is sometimes called a data connection, but typically convey commands in addition to data, and optionally convey metadata, error correction information and/or other information in addition to data values to be stored in media devices 140 and data values read from media devices 140. For example, storage devices 120 may include a peripheral component interconnect express (PCIe), serial advanced technology attachment (SATA), serial attached [small computer serial interface (SCSI)] (SAS), fibre channel, ethernet, or similar interface that may be configured to support node addressing and routing for host data channels to storage devices 120 for communicating host storage commands and responses. In some embodiments, these same host interfaces may be configured to establish peer-to-peer communication through interconnect fabric 114 and establish a peer communication channel that does not rely on host 102 for communication of peer messaging and/or peer storage commands.

In some embodiments, storage devices 120 include a plurality of media devices 140, such as flash memory devices, and optionally includes fewer device controllers 130. Viewed another way, in some embodiments, a storage device 120 includes multiple memory channels, each of which has a device controller 130 and a set of media devices 140 coupled to the device controller 130. However, in some embodiments, two or more memory channels share a device controller 130. In either example, each memory channel has its own distinct set of media devices 140. In a non-limiting example, the number of memory channels in a typical storage device is 8, 16, or 32. In another non-limiting example, the number of media devices 140 per memory channel is typically 8, 16, 32, or 64. Furthermore, in some embodiments, the number of media devices 140 in one memory channel is different from the number of media devices in another one of the memory channels.

In some embodiments, each device controller of device controllers 130 includes one or more processing units (also sometimes called CPUs or processors or microprocessors or microcontrollers) configured to execute instructions in one or more programs (e.g., in device controllers 130). In some embodiments, the one or more processors are shared by one or more components within, and in some cases, beyond the function of device controllers 130. As noted above, media devices 140 are coupled to device controllers 130 through connections that typically convey commands in addition to data, and optionally convey metadata, error correction information and/or other information in addition to data values to be stored in media devices 140 and data values read from media devices 140. Media devices 140 may include any number (i.e., one or more) of memory devices including, without limitation, non-volatile semiconductor memory devices, such as flash memory device(s).

Flash memory device(s) (e.g., media devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., media devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s), including magnetic disk or magnetic tape, and corresponding non-volatile storage controller(s).

In some embodiments, media devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

Figure 2:
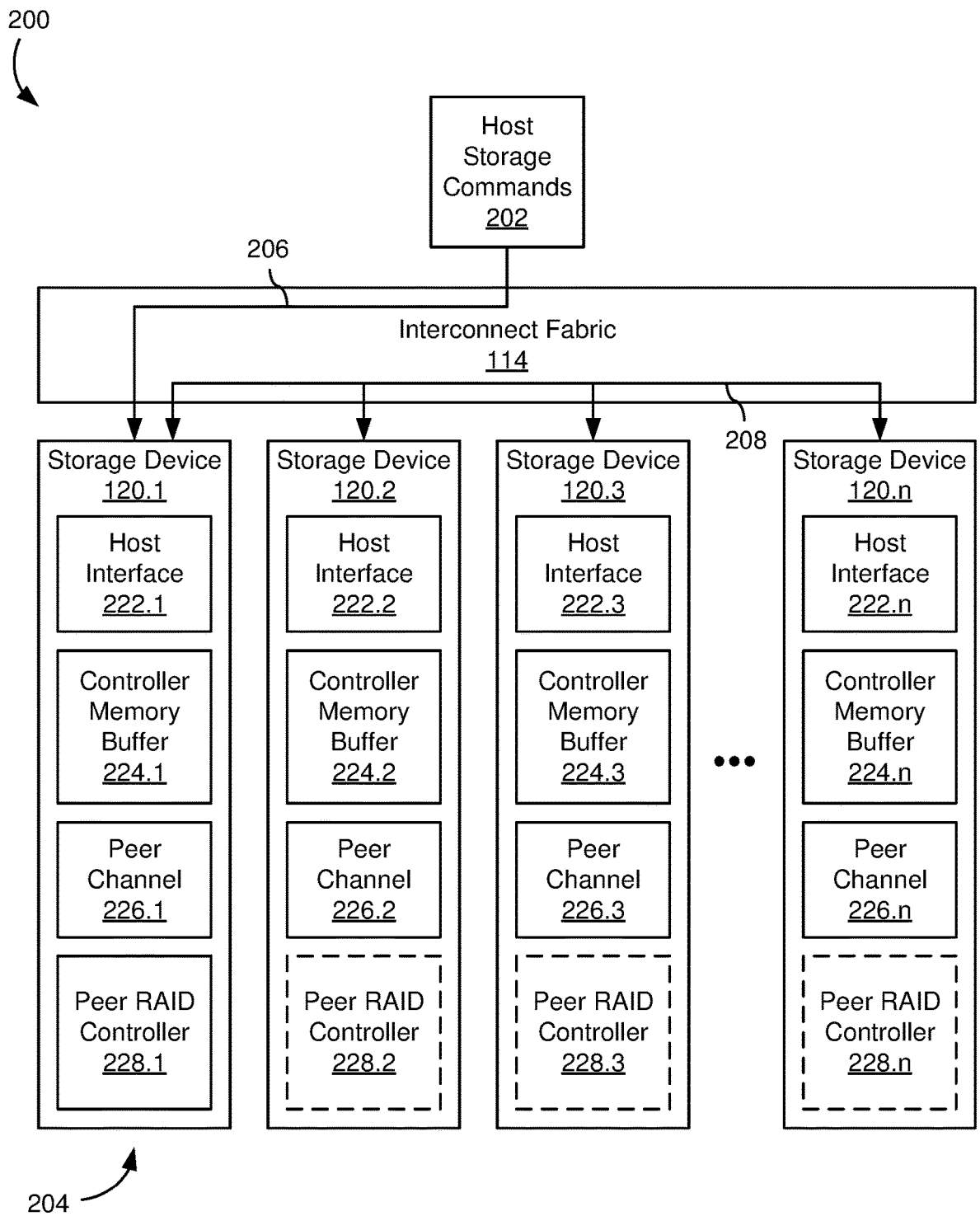
FIG. 2 schematically illustrates an example peer RAID controller configuration for the storage system of FIG. 1.

FIG. 2 is a block diagram illustrating an example peer RAID controller configuration 200 for the data storage system 100, in accordance with some embodiments, as shown in FIG. 1. In the example shown, at least four storage devices 120.1-120.$n$ are configured as a peer group. Host storage commands 202 may be received through interconnect fabric 114, such as from a host system, either directly or through a storage controller, network interface controller, or similar component. In the example shown, storage device 120.1 has been designated as the master storage device 204 for the peer RAID controller functions and receives host data commands 202. Each storage device 120 may communicate with the other peer storage devices using peer communication channel 208 through interconnect fabric 114. For example, storage device 120.1 may request and receive state information from storage devices 120.2, 120.3, and 120.$n$ and may selectively direct peer storage commands for data striping of the data units in host storage commands 202 to storage devices 120.2, 120.3, and 120.$n$.

Each storage device 120 may include a host interface 222 configured for high-bandwidth communication of host data to and from the non-volatile storage medium of that storage device. For example, host interfaces 222.1-222.$n$ may include PCIe interfaces connected to interconnect fabric 114 that support NVMe storage protocols for data transfer and management commands In some embodiments, each storage device 120 may be configured as a storage node capable of receiving and processing host storage commands from a host system. During any given operating period, one storage device, such storage device 120.1, may be configured as master storage device 204 and all high-bandwidth storage commands for RAID storage may be directed by the host system to master storage device 204. In some embodiments, the host system may only be mapped to master storage device 204 and may treat all storage locations in the peer group as belonging to master storage device 204. In some embodiments, the host system may be mapped to each storage device 120, but configured to direct all RAID storage commands to master storage device 204.

Each storage device 120 may include a controller memory buffer 224 configured for direct memory access through host interface 222. For example, controller memory buffers 224.1-224.$n$ may include remotely addressable memory locations supporting remote direct memory access (RDMA) protocols supporting command queues and data caching for host interfaces 222.1-222.$n$. In some embodiments, each storage device 120 may include one or more volatile buffer memory device configured for RDMA protocol access over interconnect fabric 114 that enables other nodes to directly write to and/or read from buffer memory locations according to NVMe protocol commands. For example, controller memory buffers 224 may include buffer storage locations designated for one or more command queues, such as host command queues for receiving host storage commands 202 and/or peer or RAID command queues for receiving peer storage commands through peer communication channel 208. Controller memory buffers 224 may also include buffer storage locations designated for one or more host data caches that receive host data units to be written to non-volatile memory from host storage commands 202 and/or RAID data blocks allocated and sent by master storage device 204 to be written to non-volatile memory. These caches may also be used for retrieving and aggregating RAID data blocks, including parity blocks, for returning and/or recovering host data units.

Each storage device 120 may include a peer channel 226 configured for peer-to-peer communication with the other storage devices in the peer group. For example, peer channels 226.1-226.$n$ may include command/response messaging and/or host data transfer through host interface 222.1 and interconnect fabric 114 to establish peer communication channel 208. In some embodiments, master storage device 204 may map to peer storage devices, such as peer storage devices 120.2-120.$n$, as a host node and use a host command set, such as NVMe host commands, for determining storage device states and health parameters and forwarding data blocks from host data units for data striping. For example, NVMe protocols may enable storage device 120.1 to map to command queues in controller memory buffers 224.2-224.$n$ and use drive state commands to determine one or more peer drive states and/or host write commands to write data blocks to the host data caches for the peer storage devices to put in non-volatile storage locations. In some configurations, a different peer communication channel than host interfaces 222 and interconnect fabric 114 may be used. For example, storage devices 120.1 may include secondary high-bandwidth interfaces for peer communications, such as a second PCIe interface and corresponding PCIe/NVMe interface processing resources, with a secondary bus or network connection among peer storage devices, such as a backplane bus or network.

In some embodiments, each peer storage device may include peer RAID controller 228 configured for executing the master storage device role and peer RAID controller functions for the peer group. For example, storage device 120.1 includes an active peer RAID controller 228.1 executing the functions of master storage device 204 and storage devices 120.2-120.n include inactive peer RAID controllers 228.2-228.n that could enable any of them to take on the master storage device role. The functions of peer RAID controllers 228 will be further explained with regard to FIG. 3.

In some embodiments, only storage device 120.1 (or whichever peer storage device is designated as master storage device 204) may include peer RAID controller 228.1 and the role may be configured in the hardware and/or software of the storage system at manufacture and/or installation. For example, storage device 120.1 may be configured with a larger volatile cache memory than peer storage devices to support a greater volume of host data and commands, as well as the parallel processing of peer storage commands for RAID storage to the peer storage devices and/or RAID retrieval from peer storage devices. In some embodiments, additional memory and processing capabilities may also be helpful for parity calculation, recovery operations, and/or RAID rebuild. In some embodiments, storage device 120.1 may be configured with multiple processor cores and the cores may be separately allocated to peer RAID controller functions and base storage device controller functions (e.g., storage, retrieval, and maintenance for data stored to the media devices of storage device 120.1). For example, a first processor core may be dedicated to peer RAID controller 228.1 and the second processor core may be dedicated to base storage device controller functions.

In some embodiments, each storage device 120 may have a similar hardware configuration (which may or may not include multiple cores and/or larger cache memory). Regardless of hardware configuration, it may be possible to move the master storage device role to a peer storage device by later installing or activating a corresponding peer RAID controller 228. The configuration could include one or more other storage devices with oversized caches and/or multiple processor cores to minimize performance changes due to role changes. In some embodiments, the master storage device role may be migrated to a different peer storage device due to an error, device failure, and/or endurance or health conditions of the current master storage device. In some embodiments, the master storage device role may be actively rotated to provide better wear levelling and distribution of the lifetime effects of the increased processing and memory use of master storage device 204. This rotation of the master storage device role may be in addition to any wear levelling and role rotation among the other storage devices managed as part of the RAID block allocation decisions.

Figure 3:
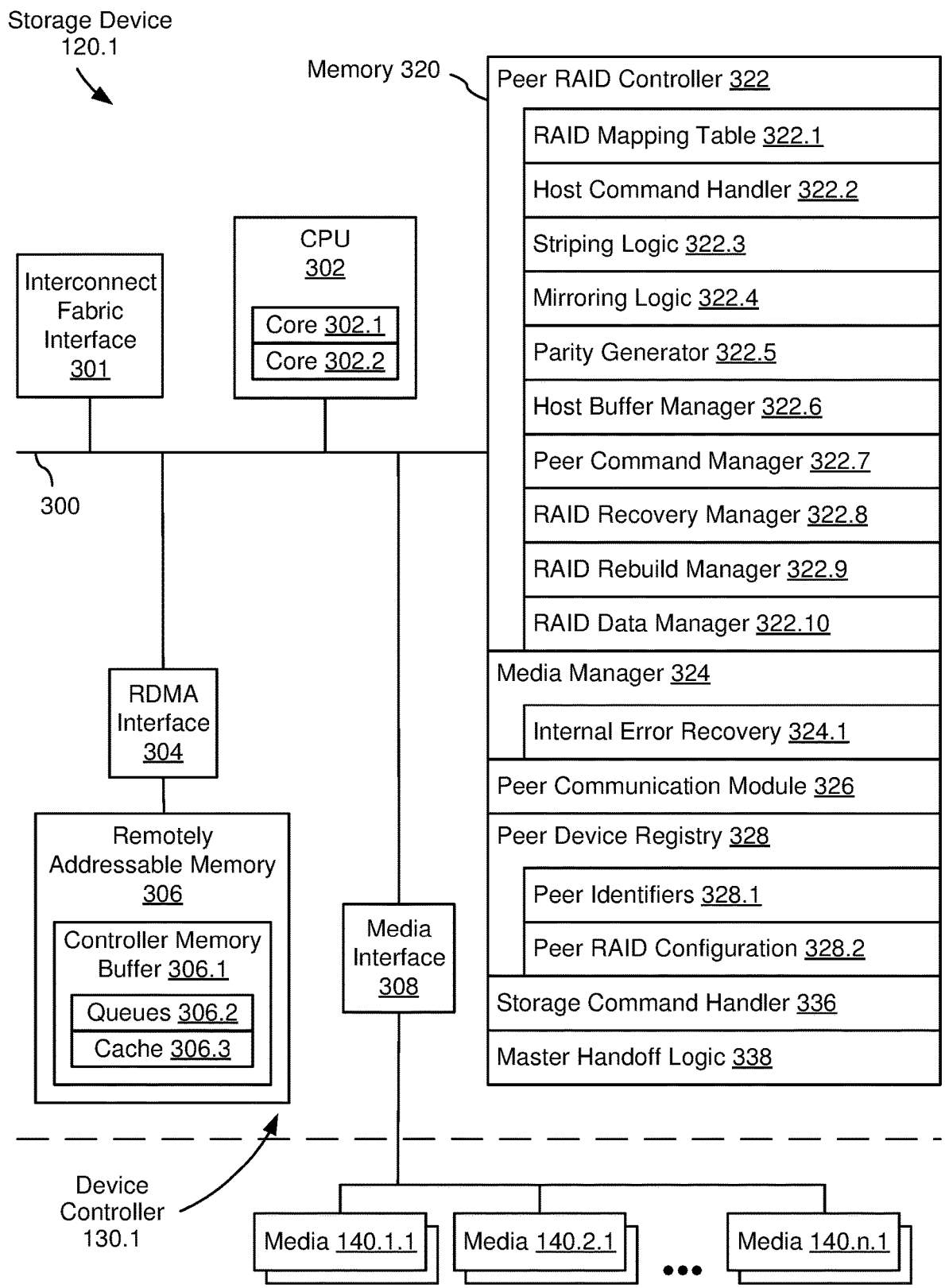
FIG. 3 schematically illustrates an example data storage device of the storage system of FIG. 1.

As shown in FIG. 3, a storage device 120.1 includes the functions of a device controller 130.1 and a peer RAID controller 322 using common compute resources, such as one or more processing units (CPUs 302), sometimes herein called CPU, processors, or hardware processors, and sometimes implemented using microprocessors, microcontrollers, or the like, configured to execute instructions in one or more programs, functions, or services (e.g., the modules in memory 320). In some embodiments, CPU 302 may include a plurality of processor cores, such as processor core 302.1 and processor core 302.2 that may be allocated to processing tasks in parallel. In some embodiments, processor cores may be separately allocated to processing a subset of functions, such as processor core 302.1 handling processing for peer RAID controller 322 and processor core 302.2 handling processing for media manager 324 (with other functions allocated to one or the other, selectively instantiated across both, or operating on still another processor core not shown). In some embodiments, the one or more CPUs 302 are shared by one or more components within, and in some cases, beyond the function of storage device 120.

The modules in memory 320 and executed by CPU 302 may be coupled to interconnect fabric interface 301, remote direct memory access (RDMA) interface 304, media interface 308, and any number of additional modules, such as erasure coding engines, error correction engines, parity calculators (e.g., XOR engines), specialized memory modules, etc., in order to coordinate the operation of these components. In some embodiments, the components of storage device 120.1 may be interconnected by one or more communication buses 300. In some embodiments, CPU 302, memory 320, media interface 308, and any number of additional modules may be packaged as a device controller 130.1, such as an NVM controller, implemented in an application-specific integrated circuit (ASIC), system on a chip (SoC), field programmable gate array (FPGA), or similar architecture.

One or more communication buses 300 optionally include circuitry (sometimes called a chipset) that interconnects and controls communications between system components. CPU 302 and memory 320 may be coupled to interconnect fabric interface 301, RDMA interface 304, remotely addressable memory 306, media interface 308, media devices 140.1, and any additional module(s) by the one or more communication buses 300. In some embodiments, interface hardware and/or protocols for providing communication through communication buses 300 may also be present for communication with any given component.

Storage device 120.1 may include a variety of local memory resources and local compute resources. In some embodiments, local resources may include components that are integrated into storage device 120.1 and may scale with the number of storage devices. Example local memory resources may include memory 320 (e.g. the operating memory of NVM controller 130.1), remotely addressable memory 306 (e.g. remotely addressable memory available through a remotely addressable interface), and other specialized memory (not shown). In some embodiments, storage media, such as media devices 140, may provide local memory resources for data management functions, but these may be distinct from storage locations for host data. Example local compute resources may include CPU 302 (e.g., the operating processor of device controller 130.1), erasure coding engines, error correction engines, parity calculators, and any other specialized processing systems. In some embodiments, one or more interfaces, such as interconnect fabric interface 301 or RDMA interface 304, may also include or utilize memory and/or compute resources and may be part of the available local resources of storage device 120.1.

Memory 320 may include high-speed random access memory (RAM), such as dynamic random access memory (DRAM), static random access memory (SRAM), double data rate (DDR) RAM, or other random access solid state memory devices, and may include non-volatile memory, such as one or more magnetic disk storage devices, optical disk storage devices, flash memory devices, or other non-volatile solid state storage devices. Memory 320 may optionally include one or more storage devices remotely located from CPU 302. In some embodiments, one or more additional memories may be provided for specific functions, such as an FTL memory for flash translation layer (FTL) data, and/or remotely addressable memory 306. These functional memories may include specialized processing, hardware acceleration, and/or other resources related to their function. In some embodiments, remotely addressable memory 306 may be part of memory 320.

In some embodiments, RDMA interface 304 may be a hardware, software, or combined hardware/software engine for providing remote data management access to remotely addressable memory 306. This may include local direct memory access (DMA) to remotely addressable memory 306 for CPU 302 or other components of device controller 130.1. The RDMA engines of RDMA interface 304 may allow storage device 120.1 to push or pull data from/to remotely addressable memory 306 and to/from similar remotely addressable memory locations in other storage devices (peer storage devices 120.1-120.n), storage controllers (e.g., storage controller 110), or servers (e.g., host 102).

Additional modules (not shown) supporting one or more functions of storage device 120 may be connected to bus 300, CPU 302, RDMA interface 304, media interface 308, and memory 320. In some embodiments, additional module(s) are executed in software by the CPU 302; in other embodiments, additional module(s) are implemented in whole or in part using special purpose circuitry (e.g., to perform encoding and decoding functions, parity calculation, encryption/decryption, etc.).

In some embodiments, during a write operation initiated by a host 102, storage system 100 receives a host write command (e.g., in a set of one or more host write commands) via interface 112 and directs the host write command to data storage device 120.1 (configured as master storage device 204) via interconnect fabric 114 (see FIG. 1). Storage device 120.1 receives the host write command through interconnect fabric interface 301 and directs the command to peer RAID controller 322 for processing. In some embodiments, host storage commands may specifically include a RAID command parameter identifying them as RAID commands to be directed to peer RAID controller 322. In some embodiments, storage device 120.1 may receive the host write command in a command queue 306.2 of controller memory buffer 306.1 configured in remotely addressable memory 306 and/or may receive the host data unit(s) to be written in cache 306.3 of controller memory buffer 306.1. The host write command may include one or more host data units and indicate one or more storage locations by host logical block address. In some embodiments, storage device 120.1 may manage the set of host logical block addresses corresponding to the aggregate storage locations of all of the peer group (e.g., the storage media locations in storage devices 120.2-120.n). Peer RAID controller 322 may aggregate and/or divide the host data unit into data blocks for RAID, calculate any parity data blocks (if appropriate for the RAID configuration), allocate the data blocks among the peer storage devices (including itself), and send the data units in peer write commands to the target peer storage devices. In some embodiments, the peer storage commands may be sent to the peer storage devices using RDMA to place the write command in a command queue on the corresponding controller memory buffer of the target data storage device. In some embodiments, the RAID data blocks may be transferred directly from cache 306.3 in storage device 120.1 to the cache of the controller memory buffers of the target peer storage devices. The host data blocks may then be stored from cache to non-volatile storage media 140 by the target peer storage devices (including storage device 120.1 storing any data blocks allocated to non-volatile storage media 140). A reverse process may be used for processing host read commands targeting host data units stored in RAID, as further described below with regard to FIG. 4.

In some embodiments, a storage media (e.g., media devices 140.1) is divided into a number of addressable and individually selectable blocks and each block is optionally (but typically) further divided into a plurality of pages and/or word lines and/or sectors, storage locations of defined storage unit sizes. While erasure of data from a storage medium is performed on a block basis, in many embodiments, reading and programming of the storage medium is performed on a smaller subunit of a block (e.g., on a page basis, word line basis, or sector basis). The data block size selected for striping host data to the peer storage devices may be configured to correlate to the erase block size of storage devices 120 or a multiple thereof to improve write efficiency.

In some embodiments, the smaller subunit of a block consists of multiple memory cells (e.g., single-level cells (SLC) or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or error correction code) is a choice made when data is actually written to the storage media.

In addition, these various memory cell configurations and encoding formats may impact the lifetime performance of storage device 120.1. Flash memory may have defined input/output (I/O) performance, endurance, write voltage thresholds, error rates, cell/device failures, and other parameters that may be tracked for specific performance values and/or contributions to storage capacity, quality of service (QoS), endurance, and/or overall health. Similarly, cell usage, read and write load balancing, garbage collection, and other operations may be tracked for endurance, reliability, and failure prediction for media devices 140. In some embodiments, storage devices 120 may include one or more device state machines for tracking workload, thermal, and other performance characteristics. In some embodiments, terabytes written (TBW) or a similar endurance value may be tracked for lifetime use (and predicted endurance) of the storage devices. Workload, thermal, and endurance state data may be used by peer RAID controller 322 in making allocation decisions for RAID data blocks.

Storage device 120.1 may include a plurality of modules or subsystems that are stored and/or instantiated in memory 320 for execution by processor 302 as instructions, operations, or programs. For example, memory 320 may include peer RAID controller 322 configured to receive host storage commands and execute RAID write and read operations among the peer storage devices based on a peer RAID configuration (e.g., peer RAID configuration 528.2). Memory 320 may include a media manager 324 configured to manage storage operations to and from non-volatile memory 140.1. Memory 320 may include a peer communication module 326 configured for peer communication with peer storage devices over a peer communication channel Memory 320 may include a peer device registry 328 configured for storing information about peer storage devices, including addressing and state information. Memory 320 may include a storage command handler 336 configured to process storage commands, including peer data commands Memory 320 may include master handoff logic 338 configured to manage passing the master storage device role and functions of peer RAID controller 322 to a different peer storage device. Memory 320, or alternatively the non-volatile memory device(s) within or accessible to memory 320, comprises a non-transitory computer readable storage medium for storing executable code for the modules or functions described.

Each of the above identified elements may be stored in one or more of the previously mentioned memory devices that together form memory 320 and corresponds to a set of instructions for performing a function described. The above identified modules or programs (i.e., sets of instructions) need not be implemented as separate software programs, procedures or modules, and thus various subsets of these modules may be combined or otherwise re-arranged in various embodiments. In some embodiments, memory 320 may store a subset of the modules and data structures identified above. Furthermore, memory 320 may store additional modules and data structures not described above. In some embodiments, some or all of these modules may be implemented with specialized hardware circuits that subsume part or all of the module functionality.

Peer RAID controller 322 may include interfaces, functions, parameters, and/or data structures for an offloaded and/or distributed service to enable storage device 120.1 and its peer storage devices to manage RAID storage and retrieval without another RAID controller between the storage devices and the host. For example, peer RAID controller 322 may provide a unified storage device interface for the array of storage devices such that, from a host perspective, the peer group may be treated as a single addressable storage space with a capacity equal to the combined capacities of all of the storage devices (or portions thereof allocated to RAID storage) and a desired RAID configuration, such as RAID 1 (mirroring), RAID 5 (distributed parity), or RAID 6 (dual parity). In some embodiments, peer RAID controller 322 may include a RAID mapping table 322.1 that provides mapping of host logical block addresses (LBAs) to RAID stripes and RAID data block storage locations across the peer storage devices. For example, RAID mapping table 322.1 may include host LBAs for all host data units written to the peer group and may include RAID stripe data mapping from the host data units in which the host data was received to data striping data blocks distributed among the peer storage devices. RAID mapping table 322.1 may be used to both store the RAID data allocations by identifying the host LBAs and the peer storage device that received the corresponding RAID data blocks and to process subsequent read, delete, or other host storage commands targeting previously written host data by providing an LBA lookup to locate the peer storage device (or combination of devices) containing the LBA. RAID mapping table 322.1 may also be used to support RAID recovery of data, such as retrieving the remaining set of available RAID data blocks for a stripe and using parity to recover a lost data block, and/or RAID rebuild of a failed storage device or component thereof.

In some embodiments, peer RAID controller 322 may include a host command handler 322.2 configured to receive all host commands (or at least all host commands related to the host data identified for RAID storage). For example, the host system may be mapped only to storage device 120.1 and interconnect fabric interface 301 for host data configured for RAID storage. In some embodiments, a namespace or similar logical storage designation may be used to map the host system to storage device 120.1 and its host interface resources, such as interconnect fabric interface 301, controller memory buffer 306.1, and the host command queues 306.2 and host data cache 306.3. For example, the host system may direct host storage commands to the namespace to send those host storage commands to queues 306.2, send host data units for writing to cache 306.3, and receive host data units read back from the peer storage devices through cache 306.3. In some embodiments, queues 306.2 may be comprised of queue pairs that also include response queues for returning storage command results to the host system, such as confirmation of write operations and/or buffer location of returned read data. Host command handler 322.2 may be configured to handle both host write commands subject to RAID storage and other host storage commands for reading, deleting, or otherwise manipulating that data, regardless of which peer storage device is actually storing the host data. For example, host command handler 322.2 may act as a command forwarder and/or retrieve the RAID data blocks from peer storage devices for subsequent host storage commands targeting previously stored host LBAs and use RAID mapping table 322.1 to process those commands.

Striping logic 322.3 may include one or more functions for determining how host data from host write commands are allocated among the peer storage devices in RAID stripes. For example, striping logic 322.3 may be configured for dividing a particular host data unit size into a plurality of smaller data blocks for distribution among the peer storage devices. In some embodiments, striping logic 322.3 may use a fixed stripe size equal to one or more host data units, such as a host block size (e.g., 512, 2K, 4K, etc. bytes) that correspond to a predetermined number of RAID data blocks. Striping logic 322.3 may then allocate the number of striping data blocks among target peer storage devices. In some embodiments, striping logic 322.3 may use buffering of host data units in cache 306.3 to assist in aggregating host data units, dividing them into striping data blocks, and allocating them among the peer storage devices. In some configurations, striping logic 322.3 may be configured to evenly distribute host data blocks among the peer storage devices, such as dividing host data units into a number of host data blocks equal to the number of storage devices in the peer group or using a round robin or similar scheme to distribute host data blocks evenly across the storage devices. For some RAID configurations, striping logic 322.3 may invoke parity generator 322.5 to determine parity for the RAID stripe. For example, striping logic 322.3 may determine a set of host data blocks for a RAID stripe and then determine one or more blocks of parity data based on the set of host data blocks. The resulting RAID stripe may include a set of RAID data blocks including both data blocks containing host data and one or more parity data blocks. In some embodiments, striping logic 322.3 may return a list of host LBAs allocated to each RAID stripe and the target peer storage devices receiving RAID data blocks for that stripe for each host write command and the host data units they contain.

In some embodiments, striping logic 322.3 may use dynamic allocation of RAID data units among peer storage devices based on their real-time states, processing capabilities, and ongoing endurance and wear levelling concerns. For example, when operating near peak throughput, individual storage devices may encounter differences in processing times and queue depths, such as due to background operations, interruptions, extended error recovery, limited failures, and/or competing non-write commands (such as reads that may not be evenly distributed among the peer storage devices). In some embodiments, striping logic 322.3 may use workload state values for each storage device to weight how new write data blocks are allocated among the storage devices. For example, striping logic 322.3 may base allocation decisions on avoiding storage devices that are over a workload threshold or exhibit a particular workload state. In some embodiments, storage devices may provide tiered workload states that identify their relative workload, such as based on queue depths, predicted processing times, competing (but necessary) background operations, and/or other dynamic workload models, and striping logic 322.3 may group and compare the peer devices by workload states to allocate to storage devices with lower workload states first.

In some embodiments, striping logic 322.3 may use thermal state values for each storage device to dynamically avoid storage devices that are at or near critical thermal levels, which could impact the reliability of the storage device or trigger processor throttling to force device cooling. For example, striping logic 322.3 may base allocation decisions on avoiding storage devices that are over a thermal threshold or exhibit a particular thermal state (such as thermal throttling). In some embodiments, striping logic 322.3 may include long-term endurance, lifetime load balancing, and/or wear levelling considerations in allocating among the peer storage devices. For example, striping logic 322.3 may compare endurance values, such as TBW, among peer storage devices and preferentially select those with lower values and/or avoid those with higher values. The foregoing striping logic examples are examples only and other configurations for applying cache-based RAID data configurations and device-state based rate levelling across a group of storage devices may be applied by striping logic 322.3.

In some embodiments, peer RAID controller 322 may include a RAID configuration that applies data mirroring instead of or in addition to data striping. For example, some RAID configurations may use mirroring logic 322.4 to write each RAID data block to two or more peer storage devices. In some configurations, mirroring logic 322.4 may operate in conjunction with striping logic 322.3 to mirror RAID stripes, parity data blocks, or some other combination. In some embodiments, mirroring logic 322.4 may include logic for caching, dividing, and allocating data blocks based on desired data block sizes, similar to striping logic 322.3. In some embodiments, mirroring logic 322.4 may include logic for allocation of RAID data blocks among the peer storage devices similar to striping logic 322.3, which may include dynamic allocation based on various device states, load balancing, and endurance and wear levelling concerns.

In some embodiments, RAID controller 322 may include a RAID configuration that applies parity calculation to the RAID stripe configuration. For example, some RAID configurations may use parity generator 322.5 to calculate one or more parity data blocks for each RAID stripe. In some embodiments, parity generator 322.5 may process host data in cache 306.3 for data blocks in a RAID stripe by dividing the data into two groups and calculating parity based on exclusive or (XOR) operations. For example, parity generator 322.5 may use a parity calculator circuit including a pair of matched registers for XOR calculations that generate resulting parity data. Parity generator 322.5 may return one or more parity data blocks for a set of data blocks including host data.

Host buffer manager 322.6 may include functions for managing host data during host storage operations, including host write operations and host read operations, through peer RAID controller 322. For example, host command handler 322.2 may direct host data units from one or more write commands into cache 306.3 and host buffer manager 322.6 may allocate the incoming host data units to align with desired RAID stripe sizes. In some embodiments, host buffer manager 322.6 may aggregate multiple host data units into a RAID stripe buffer space in order to reach the desired stripe size and may include logic for determining when to release the host data for a new RAID stripe to striping logic 322.3 (which may include release of incomplete stripes that are padded to the desired stripe size). In some embodiments, host buffer manager 322.6 may divide large host data units into multiple RAID stripe buffer spaces in order to conform to the desired stripe size. For read operations, host buffer manager 322.6 may allocate RAID data units from the peer storage devices into RAID stripe buffers in cache 306.3 to aggregate RAID stripes for retrieving target host data units. Once the host data unit is complete in cache 306.3, it may be returned to the host, such as by indicating the cache storage location for direct memory access by the host. In some embodiments, host buffer manager 322.6 may also use cache 306.3 to manage aggregation and organization of RAID data units for RAID data recovery and/or RAID data rebuild.

Peer command manager 322.7 may use the allocation decisions made by host command handler 322.2, striping logic 322.3, and/or mirroring logic 322.4 to generate storage commands to the peer storage devices for storing the host data. For example, peer command manager 322.7 may receive the list of RAID data blocks and corresponding target storage devices and generate one or more peer storage commands to each peer storage device selected to receive host data from one or more host storage commands In some embodiments, peer command manager 322.7 may be configured similarly to a host system for sending storage commands to the peer storage devices. For example, peer command manager 322.7 may use RDMA to send a peer storage command directly to a command queue in the controller memory buffer of the target peer storage device and/or to write the host data block for the write command to write cache in the controller memory buffer. In some embodiments, peer command manager 322.7 moves RAID data blocks from the buffer memory locations in host data cache 306.3 directly to the write caches of the target storage devices using the peer communication channel and direct memory access. In some embodiments, more conventional messaging or streaming paradigms for peer data transfer may be used, such as including host data in write command message payload. In some embodiments, peer command manager 322.7 may also generate internal storage commands for host data blocks allocated to the master storage device and such commands may be processed by storage command handler 336 and/or directly as storage operations by media manager 324.

In some embodiments, RAID recovery manager 322.8 may include functions for selectively recovering host data units when one or more RAID data blocks are not recoverable from the peer storage device to which they were originally stored. For example, responsive to a host read command, host command handler 322.2 may use RAID mapping table 322.1 to determine the RAID stripe containing the target host data unit and initiate peer command manager 322.7 to send peer read commands for the RAID data blocks in the RAID stripe. One of the peer storage devices may not be able to recover one or the RAID data blocks and RAID recovery manager 322.8 may be initiated to use the RAID configuration and the RAID data blocks that were retrieved to determine the contents of the missing RAID data block and recover the host data unit. For some RAID configurations, RAID recovery manager 322.8 may use a mirrored RAID data block from another peer storage device to recover the missing data. In some embodiments, RAID recovery manager 322.8 may use other RAID data blocks and at least one parity data block to recover the missing data. In some embodiments, RAID recovery manager 322.8 may enable selective recovery of a host data unit responsive to an unrecoverable error in a peer storage device without rebuilding the peer storage device with the error.

In some embodiments, RAID rebuild manager 322.9 may include functions for rebuilding a failed storage device or a portion thereof. For example, responsive to one of the peer storage devices failing completely and/or failing at a memory device level, RAID rebuild manager 322.9 may use the RAID data blocks stored in the other peer storage devices to rebuild the RAID data blocks impacted by the failure. In some embodiments, a replacement peer storage device may be added to the storage array and a complete rebuild of the RAID may be initiated to systematically read each RAID stripe, recover the missing RAID data blocks, and store them to the replacement storage device. In some embodiments, a subset of RAID stripes impacted by the failure may be determined and selectively rebuilt to another storage location in the peer storage device with the failure, redistributed among the other peer storage devices, and/or rebuilt to a replacement storage device.

In some embodiments, RAID data manager 322.10 may include functions for mirroring or otherwise protecting the RAID metadata used by peer RAID controller 322. For example, RAID data manager 322.10 may include mirroring logic for replicating RAID mapping table 322.1, peer RAID configuration 328.2, and/or other RAID metadata to at least one other peer storage device. In some embodiments, RAID data manager 322.10 may be configured to replicate peer RAID configuration 328.2 to each other peer storage device to be stored in their respective peer device registries. In some embodiments, RAID data manager 322.10 may determine at least one other peer storage device to store a backup version of RAID mapping table 322.1 and include replication logic for periodically updating the backup RAID mapping table. For example, upon completion of each new RAID stripe, the RAID mapping table entries for that new RAID stripe may be replicated to the backup RAID mapping table over the peer communication channel. In some embodiments, the backup RAID mapping table or a portion thereof may be instantiated in the controller memory buffer of the peer storage device and RAID data manager 322.10 may store the new RAID stripe entry directly to the backup RAID mapping table. In some embodiments, the portion of the backup RAID mapping table in the controller memory buffer may be periodically moved by the peer storage device into non-volatile memory. The mirrored RAID metadata may enable recovery, rebuild, and/or continued use of the RAID in the event that the master storage device fails. RAID data manager 322.10 may also support the transfer of the master storage device role by master handoff logic 338.

In some embodiments, media manager 324 may include interfaces, functions, parameters, and/or data structures for managing access to and maintenance of media devices 140. For example, media manager 324 may include base FTL services for storage device 120 and manages the storage device FTL map, as well as read, write, and data management access media devices 140. Host storage commands (including corresponding peer storage commands from the master storage device) involving host data reads, writes, erases, etc. may be directed to media manager 324 as one or more storage operations and processed through media interface 308 for accessing media devices 140. In some embodiments, host data commands may be pre-processed by storage command handler 336 and related internal data access commands (e.g., storage operations) may be received by media manager 324. In some embodiments, storage device FTL provides a base level of FTL mapping for storage device 120. Storage device FTL may include allocation of storage locations with a defined size based on compatibility of with storage units in media devices 140.1, such as page size. For example, storage locations may be allocated as 4 kilobyte (KB) or 8 KB pages. In some embodiments, allocation sizes for storage locations may correspond to larger multiplane NVM page sizes, such as 96 KB. In some embodiments, host LBAs received in storage commands and included in corresponding storage operations may be mapped to the physical storage locations by storage device FTL.

Media manager 324 may be responsible for bad block management, bad block spare overprovisioning, and allocation of gap free logical space throughout the life of the media devices 140. In some embodiments, media manager 324 may also include error correction (e.g., low-density parity-check (LDPC) or Bose-Chaudhuri-Hocquenghem (BCH) codes) supported by an error correction engine and tuning of NVM access parameter (e.g., read levels, programming thresholds, etc.). For example, media manager 324 may include internal error recovery 324.1 with error recovery logic configured to recover data stored to media devices 140. If a first read attempt fails, internal error recovery 324.1 may include a plurality of error recovery schemes based on retries, ECC decoding, varying read parameters, and/or one or more heroic recovery schemes using additional processing time and/or other resources. Internal error recovery 324.1 may be used by media manager 324 without relying on RAID data across peer storage devices to recover from read errors. In some cases, internal error recovery options may be exhausted and media manager 324 may return an unrecoverable error for one or more read operations and/or target RAID data blocks (or other data units). Media manager 324 may enable reads from logical block address (LBA) storage locations in media devices 140 to write in remotely addressable memory 306 and reads from remotely addressable memory 306 to writes in LBA storage locations in media devices 140.

In some embodiments, peer communication module 326 may include interfaces, functions, parameters, and/or data structures for providing communication among storage devices 120 using interconnect fabric 114 without being routed through storage controller 110 or another host or controller component. For example, peer communication module 326 may enable drive-to-drive messaging addressed by storage device identifiers, peer-drive broadcasts that provide the same message to all peer storage devices, and/or access to shared memory locations, such as remotely addressable memory 306 for direct data transfer and/or access of host and parity data, data management logs, peer storage commands, etc. Any (or all) of these communication modes may be used to establish a peer communication channel between and among peer storage devices. In some embodiments, packetized messages may be routed among storage devices 120.1 using one or more network communication protocols compatible with interconnect fabric 114.

In some embodiments, peer communication module 326 operates in conjunction with RDMA interface 304 to manage local and remote use of remotely addressable memory 306 and, more specifically, controller memory buffer 306.1. For example, local operations by media manager 324 may include writes and reads to cache 306.3 in remotely addressable memory 306, read/write operations may include coordinated use of cache space and command queues 306.2 in remotely addressable memory 306 for both local and remote access, and other distributed operations may use space in remotely addressable memory 306 as requested by the master storage device or other peer storage devices.

In some embodiments, peer device registry 328 may include a data structure for maintaining information regarding each other peer storage device in a peer group, such as storage devices 120 in tiered storage array 106. For example, peer device registry 328 may be a table, list, array, database, or similar data structure for storing peer storage device identifiers 328.1, other addressing information, and/or additional information on peer storage devices, such as specifications and/or parameters of the storage devices. In some embodiments, peer device registry 328 may include peer state data for each storage device, such as peer state data values collected, received, and/or determined from each peer storage device in state data fields indexed by peer storage device identifiers 328.1. In some embodiments, peer device registry 328 may include peer RAID configuration data 328.2 for determining the RAID configuration being used by peer RAID controller 322 to manage RAID data across the peer storage devices. For example, peer RAID configuration data 328.2 may include RAID parameters describing the RAID level, RAID stripe size, RAID block size, parity configuration, mirroring pairs, storage device allocation schemes (including dedicated parity devices, dynamic allocation algorithms, etc.), and other parameters for determining the RAID configuration. In some embodiments, peer device registry 328 may be stored in storage array metadata repeated in each storage device in tiered storage array 106.

In some embodiments, storage command handler 336 may include interfaces, functions, parameters, and/or data structures for receiving and parsing host and/or peer storage commands and other messages from other storage devices and systems. Storage command handler 336 may include an addressable communication channel for receiving messages from other systems or subsystems, such as hosts, storage controllers, and peer storage devices (e.g., host 102, storage controller 110, or storage devices 120). In some embodiments, storage command handler 336 may receive data management commands or requests that can be executed by the memory and compute resources of storage device 120.1, alone or in conjunction with peer storage devices. In some embodiments, storage command handler 336 may include or operate in conjunction with host command handler 322.2 for receiving and processing host storage commands Storage command handler 336 may receive and process peer storage commands, such as peer (or internal) storage commands from peer command manager 322.5 or another peer storage device acting as master storage device. Storage command handler 336 may parse the received storage commands to determine command parameters and/or identify or locate corresponding host data units for write commands In some embodiments, storage command handler 336 may place incoming storage commands in one or more command queues 306.2, such as host command queues or peer command queues, and process them based on queue order and/or priority. In some embodiments, storage command handler 336 may initiate read, write, and other storage operations based on the storage commands, target host data, and related command parameters, such as by passing storage operations to media manager 324.

In some embodiments, master handoff logic 338 may include interfaces, functions, parameters, and/or data structures for determining a transition of the master storage device role, identifying the next master storage device among the peer devices, and transitioning the functions of peer RAID controller 322 to the new master storage device. For example, storage device 120.1 may use peer RAID controller 322 to manage host commands and RAID storage operations for the peer group for an operating period then, based on a trigger condition, pass the master storage device role to another storage device, such as peer storage device 120.2. In some embodiments, the trigger conditions may include the health of storage device 120.1, an indication from an administrative system or user, and/or according to a scheduled rotation of the master storage device role. Responsive to the trigger condition, master handoff logic 338 may determine the new master storage device from among the peer storage devices. For example, a backup or next storage device may be configured in master handoff logic 338, an indication to handoff may identify the target storage device for the handoff, and/or master handoff logic 338 may include an order or selection algorithm (e.g., random, round-robin, etc.) for selecting the next master storage device.

Responsive to determining the next master storage device, master handoff logic 338 may initiate a transfer of peer RAID controller functions. In some embodiments, each storage device may include an instance of peer RAID controller 322 and the instance in the new master storage device may be activated and/or installed from a firmware package in the storage device. In other embodiments, an administrative system may update the firmware of the storage device to add a peer RAID controller. Master handoff logic 338 may then initiate a transfer of RAID mapping table 322.1 to the new master storage device. In some embodiments, master handoff logic 338 may transfer peer RAID configuration data 328.2. In some embodiments, the host system may then be remapped to the new master storage device for receiving and processing host storage commands in a next operating period. For example, the host command queues and host cache may be mapped to the controller memory buffer of the new master storage device. In some embodiments, host storage commands may be suspended for a transfer period to allow the command queues and cache from storage device 120.1 to clear and RAID mapping table 322.1 to be fully transferred and updated in the new master storage device.

Figure 4:
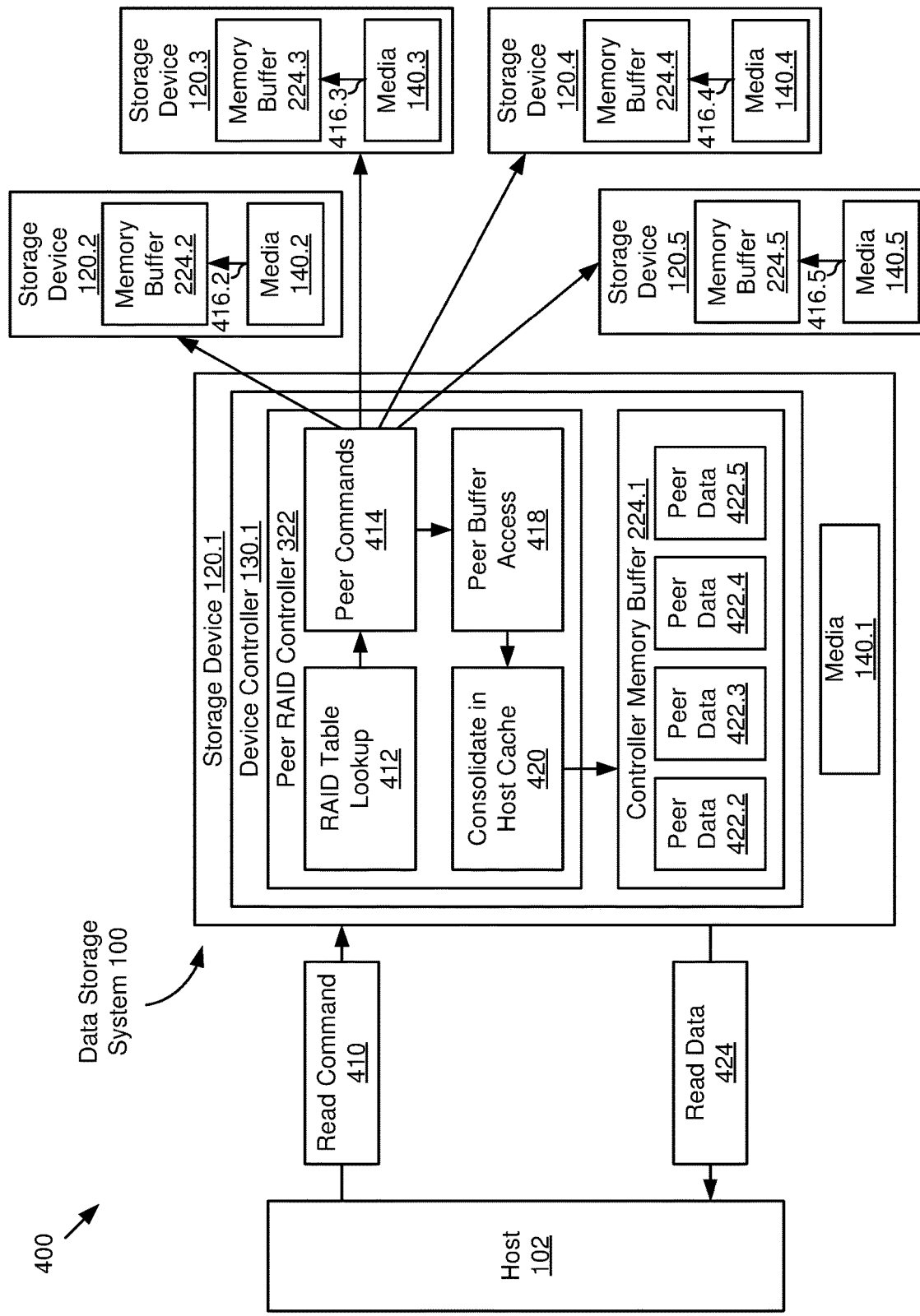
FIG. 4 schematically illustrates an example RAID read operation for the storage system of FIG. 1.

As shown in FIG. 4, storage system 100 may be operated to handle host read commands for RAID stored host data units. In configuration 400, storage device 120.1 is acting as the master storage device and storage devices 120.2-120.5 are the other peer storage devices in the storage array. Storage device 120.1 includes device controller 130.1 and media devices 140.1. Storage devices 120.2-120.5 also include device controllers (not shown in this figure) and media devices 140.2-140.5. In the example shown, storage device 120.1 includes peer RAID controller 322 and controller memory buffer 224.1 and storage devices 120.2-120.5 include their own controller memory buffers 224.2-224.5 configured for receiving peer storage commands and caching RAID data units for transfer to storage device 120.1.

In the example operation shown, host system 102 sends a read command 410 storage device 120.1. For example, host system 102 may send a read command targeting one or more host LBAs previously stored to data storage system 100. Peer RAID controller 322 may receive read command 410 and, at block 412, use the host LBAs to lookup the RAID stripe containing those LBAs in the RAID mapping table. At block 414, the peer RAID controller may generate a plurality of peer storage commands to read the RAID data units corresponding to the RAID stripe containing the target host data units. For example, each peer storage device 120.2-120.5 may include a RAID data block for the RAID stripe and a peer read command for each RAID data block may be sent to the corresponding peer storage device.

Each peer storage device may receive a peer read command and execute read operations 416.2-416.5 for the corresponding RAID data block in media devices 140.2-140.5. For example, read operations 416.2-416.5 may move the RAID data blocks from media devices 140.2-140.5 to controller memory buffers 224.2-224.5 and storage devices 120.2-120.5 may respond to storage device 120.1 indicating the buffer location of the RAID data blocks.

At block 418, peer RAID controller 322 may use peer buffer access to read the RAID data blocks from peer storage devices 120.2-120.5 using direct memory access. At block 420, the RAID data blocks may be consolidated in host cache in controller memory buffer 224.1. For example, peer RAID controller 322 may use peer data blocks 422.2-422.5 in the host cache of controller memory buffer 224.1 to reassemble one or more host data units targeted by read command 410. Storage device 120.1 may return read data 424 to host system 102. For example, storage device 120.1 may indicate the storage location of the host data units in the host cache and host system 102 may use direct memory access to transfer the host data units to host system 102.

Figure 5:
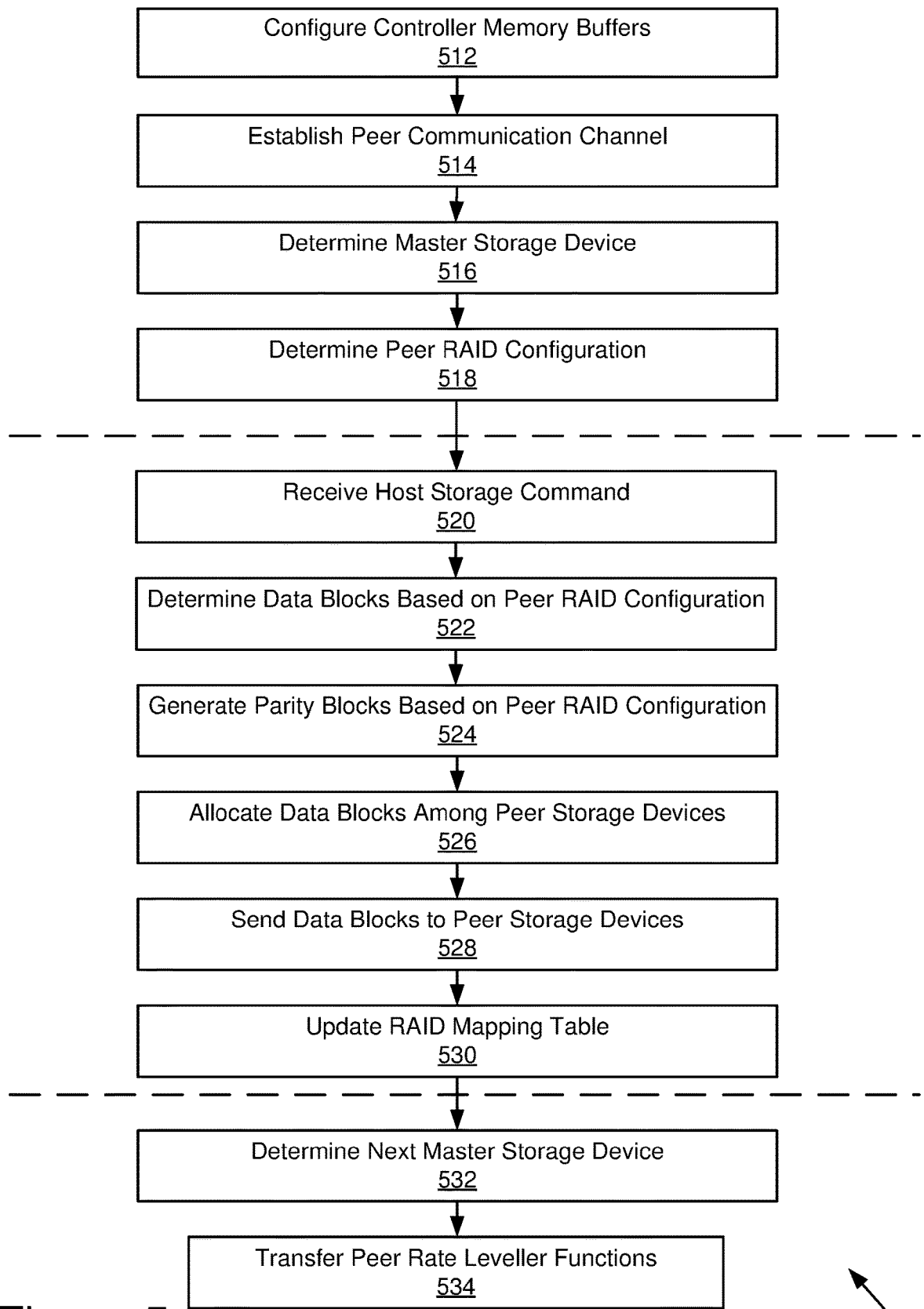
FIG. 5 illustrates an example method of peer RAID control using a master storage device in a group of peer storage devices.

As shown in FIG. 5, storage system 100 may be operated according to an example method for peer RAID control using a master storage device in a group of peer storage devices, i.e., according to method 500 illustrated by blocks 512-534 in FIG. 5. In some embodiments, blocks 512-518 may include a configuration phase for the peer group, blocks 520-530 may include host storage command processing and RAID storage by the selected master storage device, and blocks 532-534 may include handoff of the master storage device role to another peer storage device in the peer group.

At block 512, controller memory buffers may be configured. For example, the peer storage devices may be configured with remotely addressable memory configured as controller memory buffers according to NVMe interface protocols.

At block 514, a peer communication channel may be established. For example, peer storage devices may be configured with a peer device registry identifying the peer storage devices in the peer group using an administrative configuration page, discovery service, and/or one or more node mapping processes.

At block 516, a master storage device may be determined. For example, the storage system may be configured with a master storage device or include logic for assigning the master storage device role for an operating period.

At block 518, a peer RAID configuration may be configured. For example, the master storage device selected at block 416 and/or additional peer storage devices may include a configuration page with RAID parameters for a desired RAID configuration, including stripe size, block size, parity/mirroring configuration, peer allocation algorithm, etc.

At block 520, host storage commands may be received. For example, the master storage device may receive a host storage command for a host data unit represented by one or more host LBAs for RAID storage.

At block 522, a set of RAID data blocks including the host data may be determined based on the RAID configuration. For example, the master storage device may divide the host data from one or more host LBAs into a fixed number of RAID data blocks of a predetermined RAID block size.

At block 524, parity blocks may be generated based on the peer RAID configuration. For example, the master storage device may calculate parity from XORing the RAID data blocks from block 522 and populate one or more additional RAID data blocks with the resulting parity data.

At block 526, data blocks may be allocated among the peer storage devices. For example, the master storage device may allocate the RAID data block based on an allocation algorithm that distributed the blocks among the peer storage devices based on workload, wear leveling, and/or other considerations.

At block 528, RAID data blocks may be sent to the peer storage devices. For example, the master storage device may send the RAID data blocks corresponding to the host data unit(s) in the host write command to a selected set of peer storage devices targeted (at block 528) to receive the RAID data blocks.

At block 530, the RAID mapping table may be updated. For example, the master storage device may add entries for the host LBAs in the host write command and the resulting RAID stripe (or stripes), including where the corresponding RAID data blocks were written (e.g., the target peer storage device for each RAID data block, including parity blocks).

At block 532, a next master storage device may be determined. For example, the current master storage device may select a next master storage device for a next operating period.

At block 534, the peer RAID controller functions may be transferred to the new master storage device. For example, the current master storage device may activate a peer RAID controller in the next master storage device, transfer the RAID mapping table, and remap the host system connection to the next master storage device.

Figure 6:
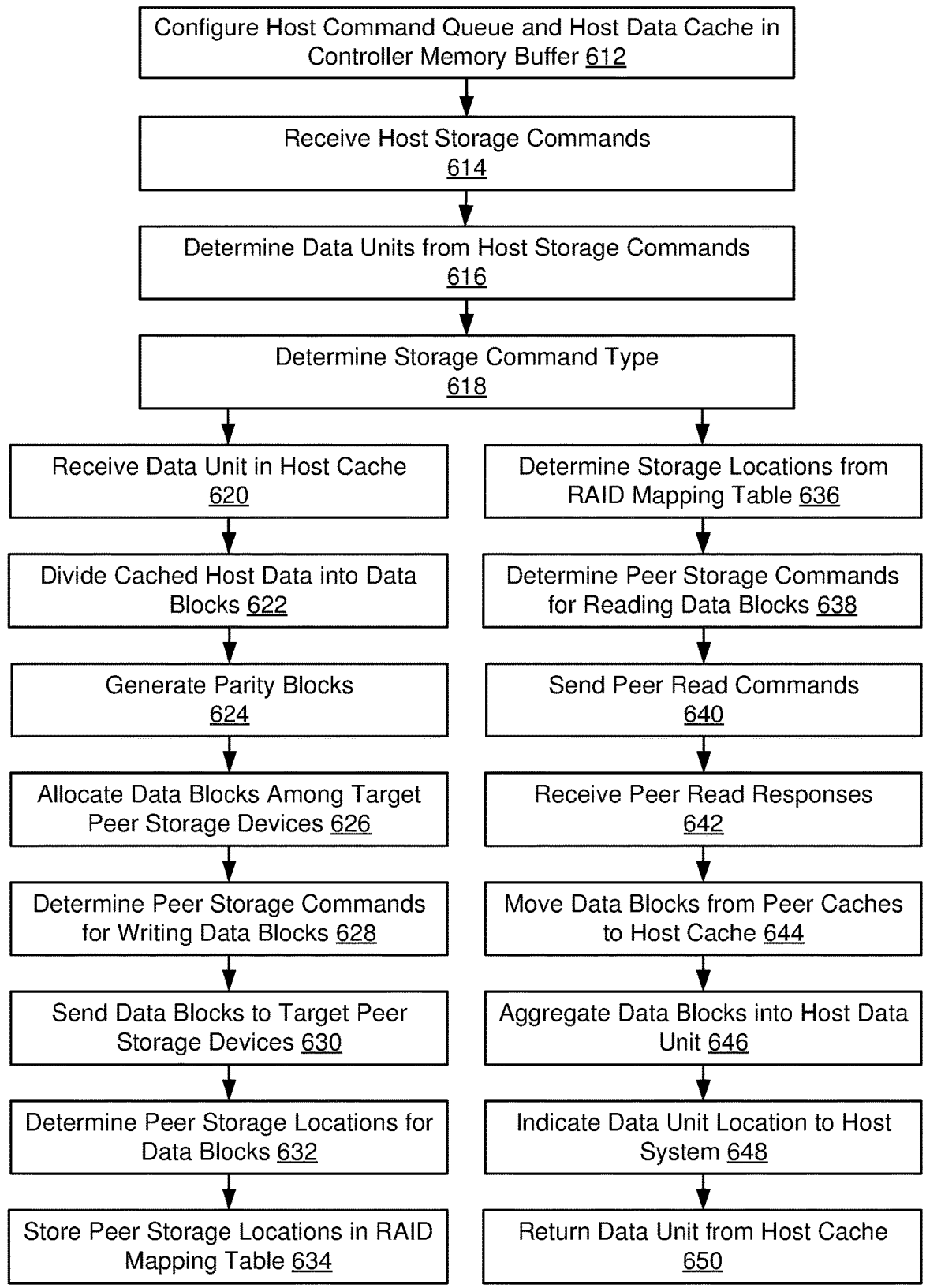
FIG. 6 illustrates example method of handling host storage commands by the master storage device for RAID control.

As shown in FIG. 6, storage device 120.1 may be operated according to an example method for handling host storage commands by the master storage device for RAID control, i.e., according to method 600 illustrated by blocks 612-650 in FIG. 6.

At block 612, host command queue and host data cache may be configured in controller memory buffer. For example, the master storage device may include a controller memory buffer that is mapped to the host system for command and response queues and host data write and read caching.

At block 614, host storage commands may be received. For example, the master storage device may receive host write commands or host read commands for a data unit including one or more host LBAs.

At block 616, data units may be determined from host storage commands. For example, the master storage device may parse the host storage commands to determine target host LBAs from the storage command parameters.

At block 618, storage command type may be determined from the host storage commands. For example, the master storage device may parse the host storage commands to determine command type (write, read, etc.) from the storage command parameters. In some embodiments, write commands may be processed using blocks 620-634 and read commands may be processed using blocks 636-650.

At block 620, the host data unit(s) may be received in host cache. For example, the host system may store the host data unit(s) for the write command in the host cache of the master storage device using direct memory access.

At block 622, the host data unit(s) in host cache may be divided into data blocks for RAID storage. For example, the master storage device may divide host data units in host data cache into a plurality of RAID data blocks based on a defined RAID stripe size, block size, and number of blocks.

At block 624, parity blocks may be generated. For example, the master storage device may generate one or more parity blocks based on the RAID data blocks determined at block 622.

At block 626, the RAID data blocks may be allocated among target peer storage devices. For example, the master storage device may select a plurality of peer storage devices (including itself) to receive the RAID data blocks (including parity blocks) and distribute storage processing across the peer storage devices based on peer workloads, thermal states, and endurance values.

At block 628, peer storage commands may be determined for writing RAID data blocks to peer storage devices. For example, the master storage device may generate peer write commands for the RAID data blocks, with the target peer storage devices as destinations.

At block 630, RAID data blocks may be sent to target peer storage devices. For example, the master storage device may write the peer write commands to the peer command queues of the peer storage devices and transfer the host data corresponding to the peer write commands from host cache in its controller memory buffer to peer write cache in the target peer storage devices' controller memory buffers.

At block 632, peer storage locations may be determined for the data blocks. For example, the master storage device may determine the mapping of the host LBAs to the RAID stripes and the target peer storage devices receiving the RAID data blocks.

At block 634, peer storage locations may be stored in the RAID mapping table. For example, the master storage device may store the host LBA to RAID stripe mappings in the RAID mapping table for use in processing subsequent host storage commands targeting those LBAs.

At block 636, storage locations may be determined from the RAID mapping table. For example, the master storage device may use the host LBAs in the host read command to index the RAID mapping table and identify one or more RAID stripes including the target host data unit(s).

At block 638, peer storage commands may be determined for reading RAID data blocks from peer storage devices. For example, the master storage device may generate peer read commands for the RAID data blocks, with the target peer storage devices based on the RAID stripe data.

At block 640, peer read commands may be sent to target peer storage devices. For example, the master storage device may write the peer read commands to the peer command queues of the peer storage devices.

At block 642, responses to the peer read commands may be received. For example, the master storage device may receive responses from each target peer storage device indicating a storage location in peer cache from which the RAID data block can be read using direct memory access.

At block 644, RAID data blocks may be moved from peer caches to host cache. For example, the master storage device may use the storage locations to transfer the RAID data blocks from the peer cache of each peer storage device to a target RAID stripe buffer in host cache of the master storage device.

At block 646, RAID data blocks may be aggregated into host data units. For example, the master storage device may use the RAID data blocks written to the RAID stripe buffer to locate the host LBAs corresponding to the requested host data units.

At block 648, host data unit locations may be indicated to the host system. For example, the master storage device may send a read response message to the host system indicating which host LBAs are located in which storage locations in the host cache.

At block 650, the host data unit may be returned to the host system from the host cache. For example, the host system may use direct memory access to read the target data units based on their LBAs and storage locations in cache.

Figure 7:
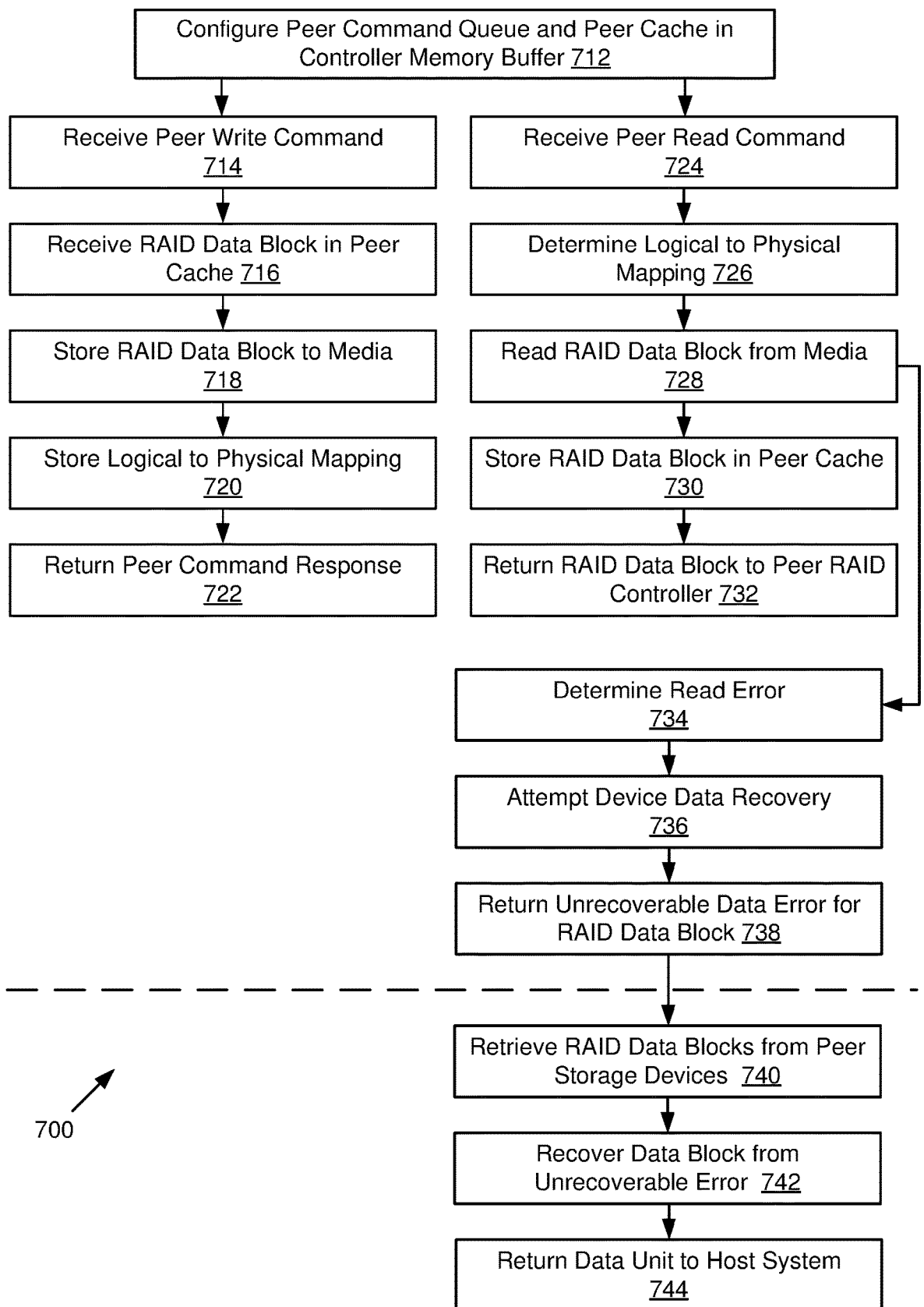
FIG. 7 illustrates an example method of handling peer RAID storage commands by the peer storage devices and example handling of unrecoverable data errors.

As shown in FIG. 7, peer storage devices 120 may be operated according to an example method for handling peer RAID storage commands by the peer storage devices and example handling of unrecoverable data errors, i.e., according to method 700 illustrated by blocks 712-744 in FIG. 7. Blocks 740-744 may be executed by a master storage device to provide RAID recovery for the peer storage device in the event of unrecoverable data errors from internal data recovery.

At block 712, a peer command queue and write cache may be configured in controller memory buffer. For example, each peer storage device may include a controller memory buffer that is mapped to the master storage device for command and response queues and host data write and read caching.

At block 714, a peer write command may be received. For example, target peer storage devices may receive peer write commands corresponding to the RAID data blocks allocated to that peer storage device.

At block 716, RAID data blocks may be received in peer cache. For example, target peer storage devices may receive the RAID data blocks corresponding to the peer write commands in their peer write cache by direct memory access.

At block 718, RAID data block may be stored to non-volatile media. For example, each peer storage device may write their RAID data block from write cache into their non-volatile memory devices.

At block 720, logical to physical mapping may be stored. For example, target peer storage devices may store the logical to physical mapping for the stored RAID data blocks in their FTL data.

At block 722, peer command responses may be returned. For example, responsive to successfully storing the RAID data blocks in non-volatile memory, the target peer storage devices may return a write confirmation through response queues in their controller memory buffers.

At block 724, a peer read command may be received. For example, target peer storage devices may receive peer read commands corresponding to the RAID data blocks in a RAID stripe needed by the master storage device (e.g., for a host read operation, RAID data recovery, or RAID rebuild).

At block 726, logical to physical mapping may be determined. For example, target peer storage devices may lookup the physical storage location based on the RAID data blocks in their FTL information.

At block 728, RAID data blocks may be read from non-volatile media. For example, target peer storage devices may read the RAID data blocks from their media devices.

At block 730, RAID data blocks may be stored in peer cache. For example, target peer storage devices may write the RAID data blocks read from their media devices into peer read cache.

At block 732, RAID data blocks may be returned to the master storage device. For example, target peer storage devices may indicate to the master storage device the storage location of the RAID data block in their peer write cache and the master storage device may retrieve it using direct memory access.

At block 734, a read error may be determined for one or more RAID data blocks. For example, an initial read attempt by one or more target peer storage devices may fail to read the RAID data block from the media devices.

At block 736, device data recovery may be attempted. For example, the target peer storage device may initiate one or more internal data recovery actions for attempting to recover the unread RAID data block.

At block 738, an unrecoverable data error may be returned for the RAID data block. For example, the target peer storage device may exhaust its internal data recovery options without successfully recovering the RAID data block and return an unrecoverable read error to the master data storage device.

At block 740, RAID data blocks may be retrieved from peer storage devices. For example, the master storage device may retrieve the other RAID data blocks for the RAID stripe that included the data block with the error. In some circumstances, the master storage device may already have received the other RAID data blocks as part of the peer read operations for the RAID stripe that triggered the original read operation.

At block 742, the RAID data block from the unrecoverable error may be recovered from the remaining RAID stripe data. For example, the master storage device may use the other RAID data blocks and parity data to calculate the missing RAID data block.

At block 744, the host data unit may be returned to the host system. For example, the master storage device may complete the host read command based on the recovered RAID data block completing the host unit data. In some embodiments, recovery of the complete RAID stripe data may also trigger rebuild of at least that RAID stripe.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, a segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage device comprising:
   one or more processors;
   a memory;
   a non-volatile storage medium;
   an interface configured to communicate with a plurality of peer storage devices over a peer communication channel;
   master handoff logic, stored in the memory for execution by the one or more processors, alone or in combination, configured to:
      receive peer redundant array of independent disks (RAID) controller functions from a prior master storage device in the plurality of peer storage devices;
      instantiate an instance of a peer RAID controller; and
      receive a RAID mapping table from the prior master storage device; and
   the peer RAID controller, stored in the memory for execution by the one or more processors, alone or in combination, configured to:
      receive, from a host system, a host storage command for a data unit;
      determine, based on a peer RAID configuration, a plurality of data blocks for redundantly storing the data unit among the plurality of peer storage devices;
      allocate, based on the peer RAID configuration, the plurality of data blocks to target peer storage devices among the plurality of peer storage devices; and
      send, through the peer communication channel, the plurality of data blocks to the target peer storage devices.

2. The storage device of claim 1, further comprising:
   the RAID mapping table, wherein the peer RAID controller is further configured to:
      determine a peer storage location for each data block of the plurality of data blocks; and
      store, for each data block of the plurality of data blocks, the peer storage location in the RAID mapping table.

3. The storage device of claim 2, wherein the peer RAID controller is further configured to:
   receive, from the host system, a host read command targeting the data unit;
   determine, based on the RAID mapping table, the peer storage location for each data block of the plurality of data blocks;
   send, to the target peer storage devices and through the peer communication channel, peer read commands for the plurality of data blocks;
   aggregate the plurality of data blocks into the data unit; and
   return, responsive to the host read command, the data unit to the host system.

4. The storage device of claim 1, wherein:
   the peer RAID controller is further configured to:
      receive the data unit from the host system in a remotely addressable memory accessible to the peer RAID controller;
      divide the data unit into the plurality of data blocks; and
      send, through the peer communication channel, a plurality of peer storage commands for writing the plurality of data blocks; and
   sending the plurality of data blocks to the target peer storage devices comprises moving the plurality of data blocks corresponding to the data unit from the remotely addressable memory accessible to the peer RAID controller to the remotely addressable memories of the target peer storage devices.

5. The storage device of claim 1, further comprising:
   a remotely addressable memory configured for direct memory access by the host system and comprising:
      at least one host command queue configured to receive the host storage command; and
      host cache configured to receive the data unit.

6. The storage device of claim 5, wherein:
   each peer storage device of the plurality of peer storage devices comprises a remotely addressable memory configured to include:
      at least one peer command queue configured to receive peer storage commands from the peer RAID controller; and
      peer cache configured to receive at least one data block of the plurality of data blocks.

7. The storage device of claim 6, wherein the peer RAID controller is further configured to, responsive to a host read command targeting the data unit:

send, to the at least one peer command queue of the target peer storage devices, peer read commands for the plurality of data blocks;

move, using direct memory access through the peer communication channel, the plurality of data blocks from the remotely addressable memories of the target peer storage devices to a data unit location in the host cache; and indicate, to the host system, the data unit location for returning the data unit.

8. The storage device of claim 1, wherein the peer RAID controller is further configured to:

generate at least one parity block based on the data unit; and add the at least one parity block to the plurality of data blocks to send to the target peer storage devices.

9. The storage device of claim 8, wherein the peer RAID controller is further configured to:

determine that at least one data block of the plurality of data blocks is unrecoverable from a target peer storage device;

recover, from the at least one parity block and a portion of the plurality of data blocks, the at least one data block that is unrecoverable from the target peer storage device; and return the data unit to the host system.

10. The storage device of claim 1, wherein:

the master handoff logic is further configured to:

determine a next master storage device from the plurality of peer storage devices; and transfer peer RAID controller functions to the next master storage device, wherein the next master storage device is configured to:

instantiate an instance of the peer RAID controller;

receive the RAID mapping table from the storage device; and notify the host system to send host storage commands to the next master storage device.

11. A computer-implemented method comprising:

establishing, among a plurality of peer storage devices, a peer communication channel;

receiving, by a first peer storage device in the plurality of peer storage devices, peer redundant array of independent disks (RAID) controller functions from a prior master storage device in the plurality of peer storage devices;

instantiating, by the first peer storage device, an instance of the peer RAID controller;

receiving a RAID mapping table from the prior master storage device;

receiving, by the first peer storage device and from a host system, a host storage command for a data unit;

determining, by the first peer storage device and based on a peer RAID configuration, a plurality of data blocks for redundantly storing the data unit among the plurality of peer storage devices;

allocating, by the first peer storage device and based on the peer RAID configuration, the plurality of data blocks to target peer storage devices among the plurality of peer storage devices; and sending, by the first peer storage device and through the peer communication channel, the plurality of data blocks to the target peer storage devices.

12. The computer-implemented method of claim 11, further comprising:

determining a peer storage location for each data block of the plurality of data blocks; and storing, for each data block of the plurality of data blocks, the peer storage location in the RAID mapping table in the first peer storage device.

13. The computer-implemented method of claim 12, further comprising:

receiving, by the first peer storage device and from the host system, a host read command targeting the data unit;

determining, by the first peer storage device and based on the RAID mapping table, the peer storage location for each data block of the plurality of data blocks;

sending, by the first peer storage device and to the target peer storage devices, peer read commands through the peer communication channel for the plurality of data blocks;

aggregating, by the first peer storage device, the plurality of data blocks into the data unit; and returning, by the first peer storage device and responsive to the host read command, the data unit to the host system.

14. The computer-implemented method of claim 11, further comprising:

receiving the data unit from the host system in a remotely addressable memory accessible to the first peer storage device;

dividing, by the first peer storage device, the data unit into the plurality of data blocks; and sending, through the peer communication channel, a plurality of peer storage commands for writing the plurality of data blocks, wherein sending the plurality of data blocks to the target peer storage devices comprises moving, by the first peer storage device, the plurality of data blocks corresponding to the data unit from the remotely addressable memory accessible to the first peer storage device to the remotely addressable memories of the target peer storage devices.

15. The computer-implemented method of claim 11, further comprising:

receiving, by the first peer storage device, the host storage command in a remotely addressable memory of the first peer storage device configured for direct memory access by the host system; and returning, by the first peer storage device and to the host system, the data unit from a host cache in the remotely addressable memory.

16. The computer-implemented method of claim 15, further comprising:

sending, by the first peer storage device, peer storage commands corresponding to the plurality of data blocks to peer command queues in remotely addressable memories in the target peer storage devices; and receiving, by the first peer storage device and from the target peer storage devices, the plurality of data blocks from peer cache in the remotely addressable memories in the target peer storage devices.

17. The computer-implemented method of claim 16, further comprising:

moving, using direct memory access through the peer communication channel, the plurality of data blocks from the remotely addressable memories of the target peer storage devices to a data unit location in the host cache of the first peer storage device; and indicating, by the first peer storage device and to the host system, the data unit location for returning the data unit.

18. The computer-implemented method of claim 11, further comprising:

generating, by the first peer storage device, at least one parity block based on the data unit, wherein the plurality of data blocks includes the at least one parity block;
determining, by the first peer storage device, that at least one data block of the plurality of data blocks is unrecoverable from a target peer storage device;
recovering, from the at least one parity block and a portion of the plurality of data blocks, the at least one data block that is unrecoverable from the target peer storage device; and
returning the data unit to the host system.

19. The computer-implemented method of claim 11, further comprising:
determining a next master storage device from the plurality of peer storage devices; and
transferring peer RAID controller functions from the first peer storage device to the next master storage device by:
instantiating, in the next master storage device, an instance of the peer RAID controller;
receiving, by the next master storage device, the RAID mapping table from the first peer storage device; and
notifying the host system to send host storage commands to the next master storage device.

20. A storage system comprising:
a plurality of peer storage devices, wherein a first peer storage device of the plurality of peer storage devices comprises:
a non-volatile storage medium;
means for establishing, among a plurality of peer storage devices, a peer communication channel;
means for receiving, by a first peer storage device in the plurality of peer storage devices, peer redundant array of independent disks (RAID) controller functions from a prior master storage device in the plurality of peer storage devices;
means for instantiating, by the first peer storage device, an instance of the peer RAID controller;
means for receiving a RAID mapping table from the prior master storage device;
means for receiving, by a first peer storage device and from a host system, a host storage command for a data unit;
means for determining, by the first peer storage device and based on a peer RAID configuration, a plurality of data blocks for redundantly storing the data unit among the plurality of peer storage devices;
means for allocating, by the first peer storage device and based on the peer RAID configuration, the plurality of data blocks to target peer storage devices among the plurality of peer storage devices; and
means for sending, by the first peer storage device and through the peer communication channel, the plurality of data blocks to the target peer storage devices.

* * * * *